United States Patent
Nakatsuka et al.

(10) Patent No.: US 7,788,488 B2
(45) Date of Patent: *Aug. 31, 2010

(54) COMPUTER VIRUS CHECK METHOD IN A STORAGE SYSTEM

(75) Inventors: Daiki Nakatsuka, Yokohama (JP); Toshio Otani, Kawasaki (JP); Kenta Shiga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1200 days.

This patent is subject to a terminal disclaimer.

(21) Appl. No.: 11/333,285

(22) Filed: Jan. 18, 2006

(65) Prior Publication Data

US 2007/0094539 A1    Apr. 26, 2007

(30) Foreign Application Priority Data

Oct. 25, 2005    (JP) ............................. 2005-309216

(51) Int. Cl.
H04L 29/06    (2006.01)
(52) U.S. Cl. .................... 713/165; 709/239; 709/238
(58) Field of Classification Search ............ 726/22, 726/23, 24; 705/51–54, 405; 713/189–194; 717/168–173, 174–178
See application file for complete search history.

(56) References Cited

U.S. PATENT DOCUMENTS

| | | | | |
|---|---|---|---|---|
| 5,421,006 A | * | 5/1995 | Jablon et al. | 714/36 |
| 5,832,208 A | * | 11/1998 | Chen et al. | 726/24 |
| 7,039,830 B2 | * | 5/2006 | Qin | 714/13 |
| 2004/0010732 A1 | | 1/2004 | Oka | |

FOREIGN PATENT DOCUMENTS

| | | |
|---|---|---|
| JP | 2004-046435 | 2/2004 |
| JP | 2004-152251 | 5/2004 |

\* cited by examiner

*Primary Examiner*—Pramila Parthasarathy
(74) *Attorney, Agent, or Firm*—Antonelli, Terry, Stout & Kraus, LLP.

(57) ABSTRACT

Upon detection of a virus definition file update, a virus check server mounts a computer's storage area in a storage apparatus via a network to check whether or not a file stored in the storage area is infected with a virus. For the virus check, the virus check server communicates with the storage apparatus via a path different from the one that is laid between a user computer and the storage system. Therefore, a virus check executed by the virus check server does not lower the computer's communication speed and disk access speed.

12 Claims, 13 Drawing Sheets

| MAC ADDRESS | IP ADDRESS | INITIATOR iSCSI NAME | TARGET IP ADDRESS | TARGET INFORMATION | |
| --- | --- | --- | --- | --- | --- |
| | | | | TARGET iSCSI NAME | LUN |
| AA:BB:CC:01:02:11 | 192.168.1.100 | Initiator A | 192.168.1.10 | Target A | 0 |
| AA:BB:CC:01:02:22 | 192.168.1.101 | Initiator B | 192.168.1.11 | Target B | 0 |
| AA:BB:CC:01:02:33 | 192.168.1.102 | Initiator C | 192.168.1.11 | Target C | 0 |

*FIG. 2*

| TARGET INFORMATION | | ACCESS STATE |
| --- | --- | --- |
| TARGET iSCSI NAME | LUN | |
| Target A | 0 | IN USE |
| Target B | 0 | IN USE |
| Target C | 0 | NOT IN USE |

*FIG. 4*

| INITIATOR iSCSI NAME | IP ADDRESS | CONNECTION SWITCH IP ADDRESS | TARGET IP ADDRESS | TARGET INFORMATION | | VIRUS CHECK STATE |
|---|---|---|---|---|---|---|
| | | | | TARGET iSCSI NAME | LUN | |
| Initiator A | 192.168.1.100 | 192.168.1.200 | 192.168.1.110 | Target A | 0 | CHECKED |
| Initiator B | 192.168.1.101 | 192.168.1.200 | 192.168.1.110 | Target B | 0 | CHECKING |
| Initiator C | 192.168.1.102 | 192.168.1.201 | 192.168.1.110 | Target C | 0 | NOT CHECKED YET |

*FIG. 6*

COMPUTER VIRUS CHECK METHOD IN A STORAGE SYSTEM

CLAIM OF PRIORITY

The present application claims priority from Japanese patent application P2005-309216 filed on Oct. 25, 2005, the content of which is hereby incorporated by reference into this application.

BACKGROUND

This invention relates to a method of taking countermeasures against computer viruses (hereinafter referred to as viruses) in a storage system that activates a computer by obtaining an operating system (hereinafter referred to as "OS") or the like via a network.

The importance of security measures in computer systems is lately becoming ever higher as threats to computer environments such as viruses and worms increase on the Internet. Computer users fight against viruses by applying a security patch to the computer's OS and applications, updating the current virus definition file, and executing a virus check. In particular, as a countermeasure against a new strain of virus, users need to update the current virus definition file and execute a virus check immediately after notified of a new virus definition file being available. However, some users find it difficult to execute the above operation without fail.

A storage-centric system has been proposed as a system that enables a system administrator to implement security measures as those described above in a unitary manner. A storage-centric system stores an OS and an application that are used by many users in an external storage system (hereinafter, a system containing a storage apparatus is called a storage system). As a result, a patch is applied to every computer in the system when an administrator of the system applies the patch to the OS and application aggregated in a storage apparatus of the external storage system. It also enables the system administrator to update security information and execute a virus check for each computer unitarily.

JP 2004-152251 A discloses a method in which a server stores the latest version of security information in each storage area in a storage apparatus that is used by a computer when security information such as a virus definition file is updated in the server. This method makes it possible to keep security information in a storage area in a storage apparatus that is used by a computer up to the latest version irrespective of whether the computer is in operation or is shut down.

SUMMARY

According to JP 2004-152251 A, to update security information in the storage area assigned to a computer that is in operation, the server disconnects the computer from the storage apparatus before executing the updating processing. A user of the computer therefore cannot access data in the storage apparatus while the server updates the security information.

Another problem results from the fact that, in a storage-centric system, file I/O in a disk drive, a tape drive, or the like is executed by a computer via a network. When many computers execute a virus check at once following a virus definition file update, file I/O accompanying a virus check increases the load on the network and causes congestion. This could lower the communication speed and access speed of the computers considerably.

Still another problem is that a virus check is processing that heavily loads a CPU by reading files in a storage area of a computer one after another and comparing the read files against a virus definition file. During a virus check, most resources of a computer's CPU are used to execute the virus check and a user who uses other programs than the anti-virus program has to endure lowering of working efficiency.

It is therefore an object of this invention to update a virus definition file and execute a virus check program in a storage-centric system without shutting down a computer that is in operation. Another object of this invention is to enable a computer to perform high-speed file I/O by preventing the computer's communication speed and disk access speed from dropping while a virus check program is executed.

In a storage-centric system, a computer (hereinafter, referred to as a virus check server), which executes a virus check on a user computer, accesses a storage area in a storage apparatus via a path different from one used by the user computer and executes a virus check on files stored in the storage area. When the storage area to be checked for viruses is being used by the user computer, the virus check server makes a copy of the storage area to execute a virus check on the copy. Detecting a file infected with a virus, the virus check server limits access from a computer that uses the infected file to other computers and then cleans the virus.

When a storage area has a large capacity, plural virus check servers respectively execute a virus check on different portions of the storage area.

BRIEF DESCRIPTION OF THE DRAWINGS

The present invention can be appreciated by the description which follows in conjunction with the following figures, wherein:

FIG. 2 shows one example of a configuration of a configuration information table;

FIG. 4 shows one example of a configuration of an LU access management table;

FIG. 6 shows one example of a configuration of a check state management table;

DETAILED DESCRIPTION OF THE PREFERRED EMBODIMENTS

A first embodiment and a second embodiment of this invention will be described as modes of carrying out this invention.

In a storage-centric system of the first embodiment, a virus check server accesses a storage area in a storage apparatus via a path different from one used by a user computer and executes a virus check on files stored in the storage area. Specifically, the virus check server updated to a new virus definition file mounts, via a network, a storage area of a user computer in the storage apparatus to check files stored in the storage area for virus infection in place of the user computer. The word, "mount" refers to an operation for making a disk drive or the like recognizable and available to a computer. When the storage area to be checked for viruses is being used by the user computer, the virus check server makes a copy of the storage area to execute a virus check on the copy.

Detecting a file infected with a virus, the virus check server limits access from a computer that uses the infected file to other computers and then cleans the virus. Specifically, finding an infected file in a logical unit (LU), which is obtained by logically partitioning a storage area, the virus check server changes, before cleaning a virus out of the infected file, filter settings of a switch to which a computer that has the infected file is connected so as to prevent the computer from accessing other parts of the system than its assigned storage area in the storage apparatus and the virus check server.

In a storage-centric system according to the second embodiment, plural virus check servers respectively execute a virus check on different LUs when there are plural LUs in a storage apparatus. Specifically, one representative virus check server and an arbitrary number of virus check servers (arbitrary but more than one) are prepared, and the representative virus check server holds management information about whether or not a virus check has been executed on an LU in the storage apparatus. The plural virus check servers request the representative virus check server to provide identification information of LUs that have not received a virus check, and respectively execute a virus check on LUs identified by the provided identification information.

The following descriptions on embodiments of this invention will be given with reference to the accompanying drawings.

First Embodiment

With reference to FIG. 1 to FIG. 11, the first embodiment will be described.

Figure 1:
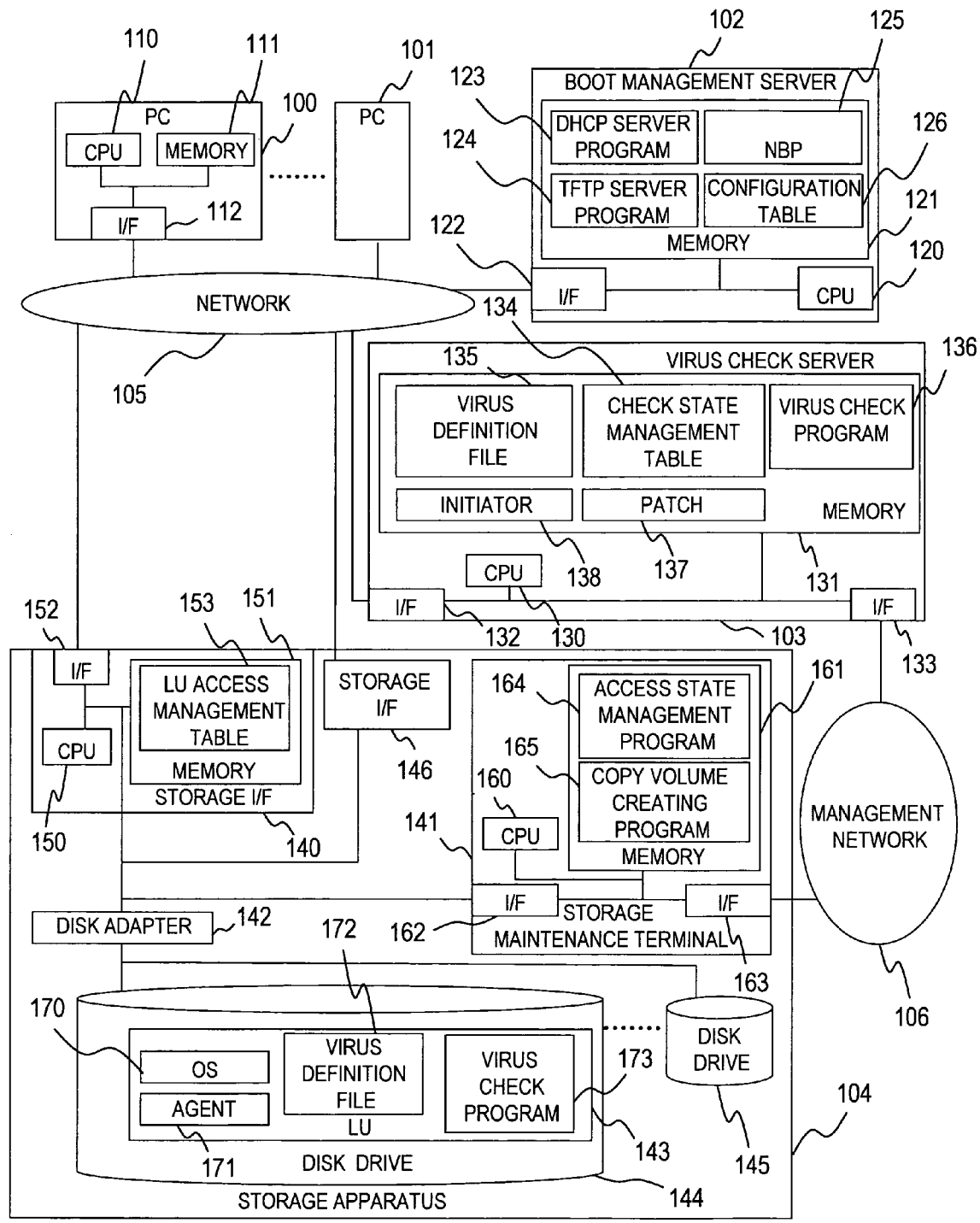
FIG. 1 is a diagram showing one example of a system configuration of a first embodiment.

FIG. 1 is a diagram showing one example of a system configuration of the first embodiment.

As shown in FIG. 1, a system of this embodiment has a PC 100, which is a personal computer (PC) without a disk drive such as a hard disk, plural PCs 101, a boot management server 102, which sends a boot program executed when the PC 100 is booted to the PC 100, a storage apparatus 104, which stores an OS executed on the PC 100, data created by a user on the PC 100, and the like, a virus check server 103, which accesses a storage area in the storage apparatus 104 to check whether a virus is present or not, and a network 105 and a management network 106 which have a function of transferring an Internet Protocol packet (IP packet).

The system in the example shown in FIG. 1 has only one storage apparatus 104, but there may be more than one storage apparatus 104.

The network 105 and the management network 106 are not limited to IP networks and may instead be Fibre Channel network, for example.

The PC 100 has, as a hardware configuration, a processor 110 (hereinafter referred to as "CPU 110"), which controls the operation of software, a memory 111, which stores software executed by the CPU 110, and an interface 112 (hereinafter referred to as "I/F 112"), which is connected to the network 105.

The PCs 101 have the same hardware configuration as that of the PC 100, and a description thereof is omitted. In the following description, the PC 100 is treated as a PC representing all the PCs in the system of this embodiment.

The storage apparatus 104 has a storage interface 140 (hereinafter referred to as "storage I/F 140"), which receives an IP packet sent from the PC 100 or other equipments, a disk drive 144, which has a storage area, plural disk drives 145, a disk adapter 142, which reads and writes data in an LU following a received I/O command, and a storage maintenance terminal 141, which is used by an administrator of the system or the like to maintain the storage apparatus 104. As shown in FIG. 1, the storage apparatus 104 has a storage I/F 146, which receives an IP packet from the virus check server 103 via the network 105, aside from the storage I/F 140, which receives an IP packet from the PC 100 or other equipments via the network 105. In the case where the network 105 has a loop configuration of Fibre Channel (FC), for example, the storage I/F 146 may be connected to an interface of the virus check server 103 (I/F 132).

The disk drive 144 includes a logical unit 143 (hereinafter referred to as "LU 143"), which is a logical storage area. In the example of FIG. 1, the disk drive 144 has only one LU, but may have plural LUs. Alternatively, plural disk drives may constitute one LU.

In the following description, the LU 143 is treated as an LU representing all LUs in the system of this embodiment.

The storage I/F 140 has, as a hardware configuration, a processor 150 (hereinafter referred to as "CPU 150"), which executes iSCSI protocol processing and reads and writes data in a table stored in a memory 151, the memory 151, which is a storage area to store information necessary for the CPU 150 to execute iSCSI protocol processing, and an interface 152 (hereinafter referred to as "I/F 152"), which is an interface connected to an external network. There may be as many storage I/Fs 140 as the number of equipments connected to the storage apparatus 104 via a network.

The memory 151 stores an LU access management table 153.

The LU access management table 153 is a table to store information on whether or not a PC in the system is mounting an LU in the storage apparatus 104. Details of the LU access management table 153 will be described later with reference to FIG. 4.

The storage I/F 146 has the same configuration as that of the storage I/F 140, and a description thereof is omitted. The storage I/F 146 may not have the LU access management table 153.

The storage maintenance terminal 141 has, as a hardware configuration, a processor 160 (hereinafter referred to as "CPU 160"), a memory 161, which stores software executed by the CPU 160, an interface 163 (hereinafter referred to as "I/F 163"), which is connected to the management network 106, and an interface 162 (hereinafter referred to as "I/F 162"), which is connected to the storage apparatus 104. The memory 161 stores an access state management program 164 and a copy volume creating program 165.

The CPU 160 executes the access state management program 164 to communicate, upon reception of an access state inquiry, with the storage I/F 140, obtain information held in the LU access management table 153, and sends the obtained information in response to the inquiry. Details of this processing will be described later.

The CPU 160 executes the copy volume creating program 165 to create a copy of an LU. For instance, the system administrator requests, via the management network 106, the storage maintenance terminal 141 to create a copy of the LU 143. The request contains target information (a target iSCSI name and an LUN) to be assigned to the LU copy. Receiving the request, the CPU 160 creates an LU that has the same disk capacity as the LU 143, and issues an I/O request to the disk adapter 142 in order to copy data in the LU 143 to the created LU. After the data is copied, the CPU 160 issues a request to the storage I/F 140, thereby requesting the storage I/F 140 to write the target information of the newly created LU copy in the LU access management table. In this manner, the CPU 160 creates a copy of an LU.

The LU 143 stores an OS 170, which is software executed by the CPU 110, an agent 171, a virus check program 173 and a virus definition file 172. The LU 143 may also store data created by a user of the PC 100, and software installed by the user of the PC 100 by the user's own accord.

The virus definition file 172 is a file containing characteristics of a virus. The CPU 110 executes the virus check program 173 to compare files in the LU 143 against a virus's characteristics contained in the virus definition file 172 and to clean a virus out of a file that is identified as an infected file if there is any in the LU 143.

The CPU 110 executes the agent 171 to receive, from the virus check server 103, a patch (security patch program) for an OS or for an application, the latest virus definition file, and the file name of a file infected with a virus. Based on the received information, the virus check program 173 is activated in order to apply the security patch, update the current virus definition file with the new one, and clean the file infected with a virus. Details of how the system operates when the CPU 110 executes the agent 171 will be described later.

The boot management server 102 has, as a hardware configuration, a processor 120 (hereinafter referred to as "CPU 120"), a memory 121, which stores software executed by the CPU 120, and an interface 122 (hereinafter referred to as "I/F 122"), which is connected with an external network.

The memory 121 stores a DHCP server program 123, a TFTP server program 124, a network boot program 125 (hereinafter referred to as "NBP 125") and a configuration information table 126.

The configuration information table 126 holds information consulted when the CPU 120 executes the DHCP server program 123 and the TFTP server program 124. A configuration example of the configuration information table 126 will be described later with reference to FIG. 2.

The CPU 120 executes the DHCP server program 123 and the TFTP server program 124, to thereby net-boot the PC 100 (in which the PC 100 is booted by reading the OS 170 onto the memory 111 via the network 105 and executing the OS 170). What processing is executed when the PC 100 is net-booted will be described later with reference to FIG. 3.

The virus check server 103 has, as a hardware configuration, a processor 130 (hereinafter referred to as "CPU 130"), a memory 131, which stores software executed by the CPU 130, and the interface 132 and an interface 133 (hereinafter referred to as "I/F 132" and "I/F 133", respectively), which are connected to external networks.

The memory 131 stores a check state management table 134, a virus definition file 135, a virus check program 136, a patch 137, and an initiator 138.

The initiator 138 is software that has a function of carrying out file I/O between the virus check server 103 and the storage apparatus 104 by storing (encapsulating), in a payload of an IP packet, a read/write request (SCSI command or the like) that is issued by an OS or an application executed by the CPU 130 to read/write data in the LU 143, and sending the IP packet to the network 105 via the I/F 132.

Instead of implementing the above function by having the CPU 130 execute the initiator 138, hardware that has a function equivalent to the initiator 138 may be provided in the I/F 132 to carry out file I/O between the virus check server 103 and the storage apparatus 104. An I/F with hardware having a function equivalent to the initiator 138 as this is known as an iSCSI host bus adapter.

The virus definition file 135 is similar to the virus definition file 172 and stores information indicating characteristics of a virus. The term computer virus refers to a program created to intentionally cause some form of damage such as destroying data and making a computer unbootable.

The virus definition file 135 is a file created by a vendor of the virus check program 136, and is updated every time a new strain of virus is let loose.

The CPU 130 executes the virus check program 136 to access, via the Internet, a virus definition file distributing server (not shown in the drawing) which is executed by the vendor of the virus check program 136. The CPU 130 compares a date when a virus definition file stored in the virus definition file distributing server is created against a date when the virus definition file 135 is created. In the case where the virus definition file 135 is older than the virus definition file stored in the virus definition file distributing server, the CPU 130 downloads the virus definition file from the virus definition file distributing server and updates the virus definition file 135. Access to the virus definition file distributing server from the CPU 130 as this may be executed by the CPU 130 automatically and regularly (every other day, for example), or may be executed manually with an instruction from the system administrator which instructs the CPU 130 to access the virus definition file distributing server.

The virus check program 136 is software having similar functions to the ones the virus check program 173 has. Specifically, the virus check program 136 has a function of cleaning a virus based on the virus definition file 135, and a function of updating the virus definition file 135 with the latest virus definition file obtained from the virus definition file distributing server. The virus check program 136 also has a function of updating the check state management table 134 and a function of issuing a request to the copy volume creating program 165 to create a volume copy. Details of these functions of the virus check program 136 will be described later with reference to FIG. 8.

The patch 137 is a program having a function of repairing a security hole (security weak point resulting from software design error or the like) in an OS or an application that is shared by the PC 100 and the PCs 101. When a security hole is found in an OS or an application, the vendor of the OS or the application creates the patch 137 and distributes the patch 137 to users. The system administrator downloads, via the Internet, the patch 137 distributed through a patch distributing server which is operated by the vendor, or obtains a CD-ROM or other recording medium in which the patch 137 is recorded. The system administrator manually stores the obtained patch 137 in the memory 131. Alternatively, software having a function of regularly accessing the patch distributing server and, when there is a new patch 137 stored in the patch distributing server, automatically downloading the new patch to store it in the memory 131 may be installed in the memory 131 and executed by the CPU 130.

The check state management table 134 is used to manage whether or not the virus check server 103 has executed a virus check on a file stored in an LU in the storage apparatus 104. Details of the check state management table 134 will be described later with reference to FIG. 6.

Details of the system including a switch that is connected to a network and used in cleaning a virus in the first embodiment will be described later with reference to FIG. 5.

FIG. 2 shows one example of a configuration of the configuration information table 126.

The configuration information table 126 includes, as shown in FIG. 2, an MAC address 200, an IP address 201, an initiator iSCSI name 202, a target IP address 203, a target iSCSI name 204, and an LUN 205.

An MAC address, which is the identifier of the I/F 112 owned by the PC 100 is stored as the MAC address 200. An IP address assigned to the I/F 112 is stored as the IP address 201. An initiator iSCSI name which is used by the storage apparatus 104 to identify a PC is stored as the initiator iSCSI name 202. The IP address of a storage I/F that is accessed by the PC 100 when the PC 100 is net-booted is stored as the target IP address 203. Target information, which is the identifier of an LU, is stored as the target iSCSI name 204 and the LUN 205. LUN stands for Logical Unit Number, and is used when, for example, a physical device is partitioned logically.

Figure 3:
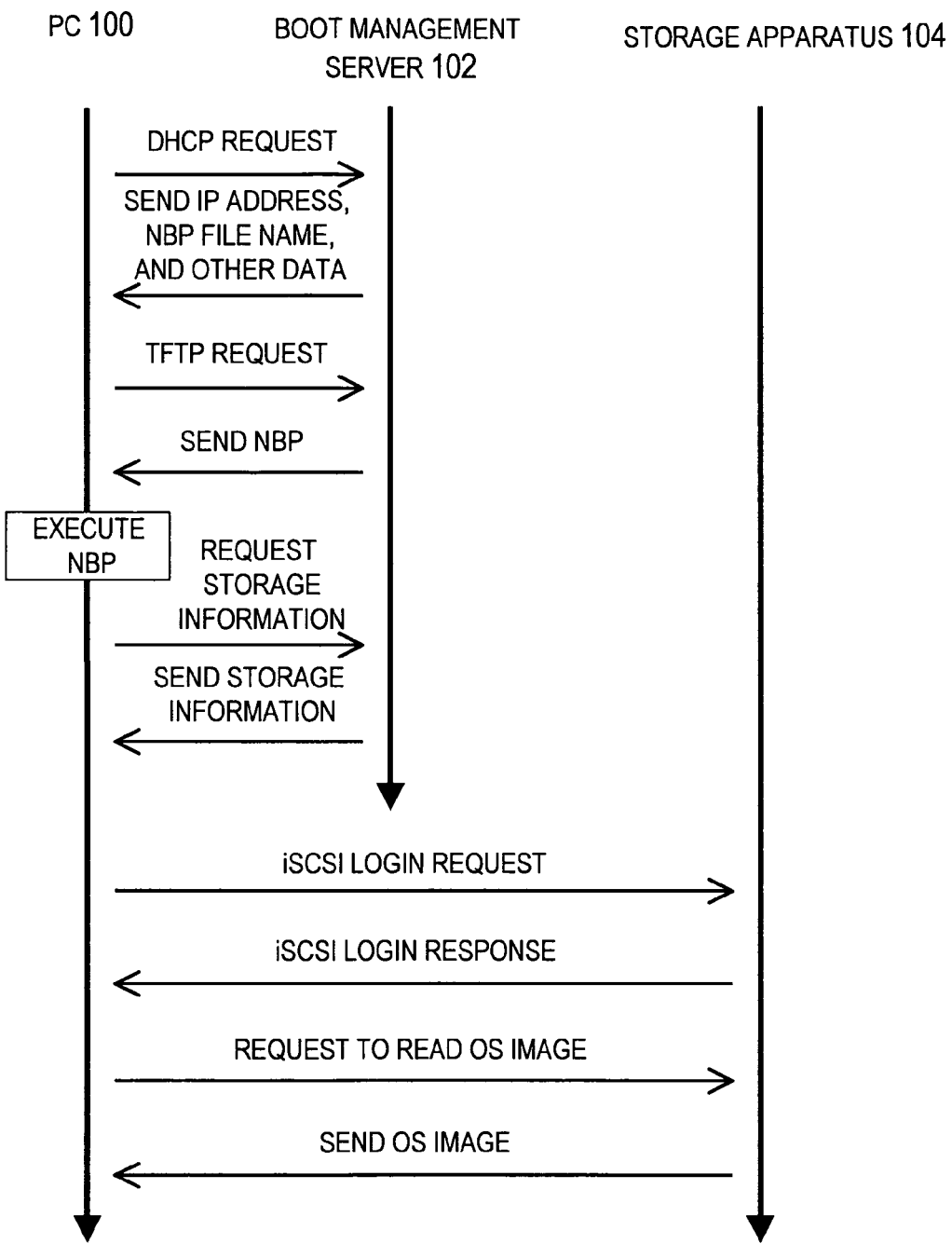
FIG. 3 is a diagram showing an operation sequence of net boot.

FIG. 3 shows, in the form of a sequence diagram, what processing is executed by the CPU 120 and the CPU 110 when the PC 100 is net-booted.

As shown in FIG. 3, the CPU 110 is booted by turning on the power or the like and immediately issues a DHCP request to the boot management server 102. Receiving the DHCP request, the CPU 120 executes the DHCP server program 123 to search the configuration information table 126 with the MAC address of the PC 100 that is contained in the request as a key. Through the search, an entry whose MAC address 200 matches the MAC address of the PC 100 is identified. Then the CPU 120 sends information of the IP address 201 and a file name of the NBP 125 which are contained in this entry to the PC 100 as a response to the DHCP request.

Receiving the DHCP response, the CPU 110 sends a TFTP request to the boot management server 102 in order to request the boot management server 102 to send a file that has the file name contained in the response (in other words, to send the NBP 125). The CPU 120 receives the TFTP request and executes the TFTP server program 124 to send the NBP 125 to the PC 100 as a response to the TFTP request.

The CPU 110 stores, in the memory 111, the data sent as the TFTP response. After the transmission is ended, the CPU 110 executes the stored NBP 125 to ask the boot management server 102 for information necessary to iSCSI-login to the storage apparatus 104. Receiving the inquiry, the CPU 120 again searches the configuration information table 126 for an entry whose MAC address 200 matches the MAC address of the PC 100. Then the CPU 120 sends, to the PC 100, information from the initiator iSCSI name 202 to the LUN 205 in this entry.

To mount the LU 143 in executing the NBP 125, the CPU 110 issues an iSCSI login request to the storage apparatus 104 based on the information sent from the boot management server 102. After receiving an iSCSI login response from the storage apparatus 104, the CPU 110 starts reading the OS 170 out of the LU 143.

Finally, the CPU 110 executes the OS 170 read onto the memory 111, thereby completing net-booting the PC 100.

Figure 4:
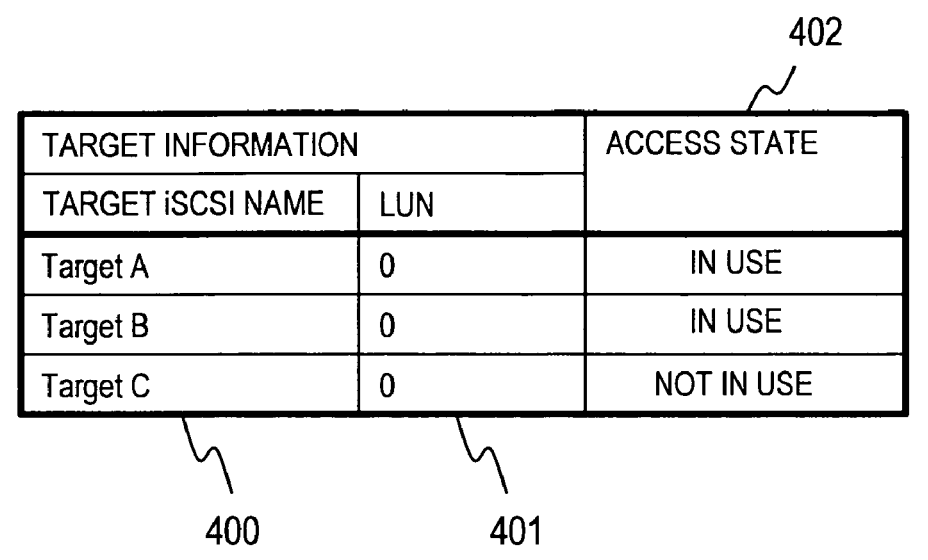

FIG. 4 shows one example of a configuration of the LU access management table 153.

The LU access management table 153 includes, as shown in FIG. 4, fields to store target information, which is information for uniquely identifying an LU in the storage apparatus 104, and an access state 402, which indicates whether or not the LU is being mounted by a PC. Target information is a combination of a target iSCSI name 400 and an LUN 401.

The target iSCSI name 400 and the LUN 401 are information entered when the system administrator creates an LU in the storage apparatus 104. As the system administrator enters the information, the CPU 150 adds the information to the LU access management table 153.

The CPU 150 also writes "not in use" as default of the access state 402.

When mounting an LU in the storage apparatus 104, the PC 100 issues an LU mount request (iSCSI login request) to the storage apparatus 104 following a method that is determined by the iSCSI standard. Similarly, the PC 100 issues an unmount request (iSCSI logout request) to the storage apparatus 104 when unmounting an LU in the storage apparatus 104. Upon reception of an iSCSI login request from the PC 100, the CPU 150 searches the LU access management table 153 using target information that is contained in the request. Through the search, an entry whose LUN 401 matches the requested LU is identified and "in use" is written as the access state 402 of this entry. Similarly, upon reception of an iSCSI logout request from the PC 100, the CPU 150 searches the LU access management table 153 using target information that is contained in the request. Through the search, an entry whose LUN 401 matches the requested LU is identified and "not in use" is written as the access state 402 of this entry.

The CPU 150 thus judges whether or not an LU in the storage apparatus 104 is being mounted by the PC 100 by consulting the LU access management table 153.

Figure 5:
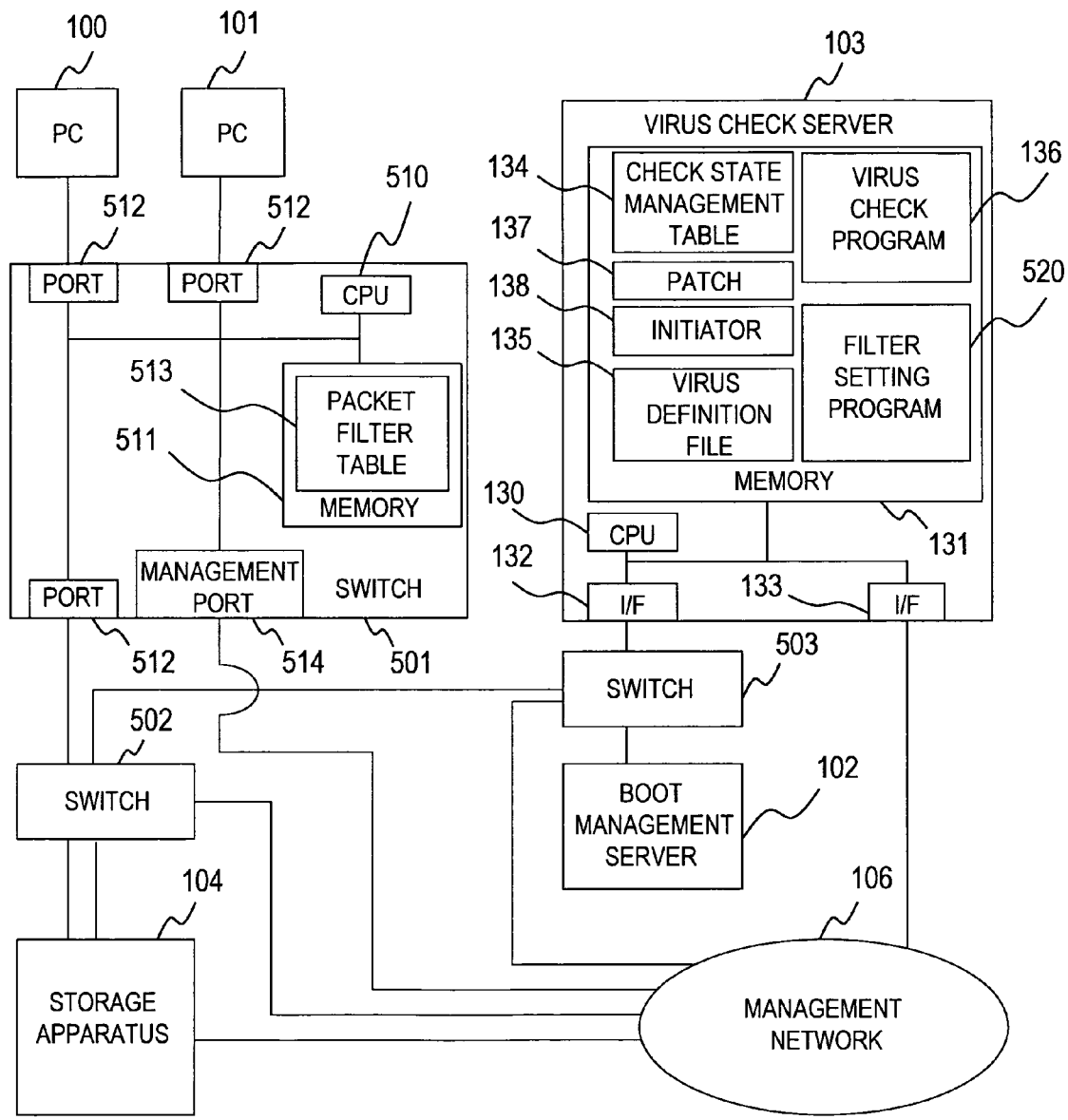
FIG. 5 is a diagram showing one example of a system configuration including switches.

FIG. 5 is a diagram showing a detailed system configuration that includes switches in one of the networks of FIG. 1. In FIG. 5, a network that connects the PC 100, the PC 101, the boot management server 102, the virus check server 103, and the storage apparatus 104 with one another is constituted of a switch 501, a switch 502, and a switch 503.

The switch 501, the switch 502, and the switch 503 have plural network connection interfaces, and are given a function of transferring a received IP packet to other equipments (e.g., the PC 100 and the storage apparatus 104). To carry out the IP packet transfer, a received IP packet has to be sent out from an appropriate port, which is determined by the switch 501, the switch 502, and the switch 503 in a manner that makes sure that the IP packet reaches an end point IP address (destination IP address) that is contained in a received IP packet.

As shown in FIG. 5, the switch 501 has, as a hardware configuration, a CPU 510, a memory 511, plural ports 512, and a management port 514. The CPU 510 is a processor having a function of reading data out of an IP packet and, based on the read data, determining from which one of the ports 512 the IP packet is to be sent out. The CPU 510 also has a filter function, a function of judging whether a received IP packet is to be transferred or discarded based on the data of a packet filter table 513, which is stored in the memory 511. Details of the filter function will be described later.

The ports 512 are connection terminals of network cables.

The packet filter table 513 holds rules applied to execution of the filter function by the CPU 510. A configuration example of the packet filter table 513 will be described later with reference to FIG. 7.

The management port 514 is a port for management of the switch 501 via the network. An example of management of the switch 501 is to set the packet filter table 513. The system administrator or a filter setting program sends a command to the management port 514 over the management network 106, thereby adding or deleting a filter rule.

The switch 502 and the switch 503 have the same hardware configuration as that of the switch 501, and a description thereof is omitted.

The virus check server 103 has a filter setting program 520.

The filter setting program 520 is software having a function of setting filter rules to the switches in the system. The CPU 130 executes the filter setting program 520 to send over the management network 106 a command to add a filter rule, thereby changing the data of the packet filter table 513 in each of the switches 501, 502, and 503.

FIG. 6 shows one example of a configuration of the check state management table 134.

The check state management table 134 includes, as shown in FIG. 6, an initiator iSCSI name 600, an IP address 601, a connection switch IP address 602, a target IP address 603, a target iSCSI name 604, an LUN 605, and a virus check state 606.

Information used when the virus check server 103 mounts an LU in the storage apparatus 104 is stored in the initiator iSCSI name 600.

An IP address assigned to the I/F 112 of the PC 100 that uses an LU identified by the target iSCSI name 604 and the LUN 605 is stored as the IP address 601.

The IP address of the management port 514 in the switch 501 connected to the PC 100 and other PCs is stored as the connection switch IP address 602. The IP address of a storage I/F accessed by the virus check server 103 is stored as the target IP address 603. In the first embodiment, the virus check server 103 is connected to the storage I/F 146, which is different from the storage I/F 140 used by the PC 100. Therefore, the IP address of the storage I/F 146 is stored as the target IP address 603.

Target information which serves as an identifier of an LU is stored as the target iSCSI name 604 and the LUN 605.

Information indicating whether or not a file stored in each LU has finished a virus check is stored as the virus check state 606. Information indicating that an LU has not received a virus check, "not checked yet" is stored as default of the virus check state 606. Information stored as the virus check state 606 is updated when the CPU 130 executes the virus check program 136 in accordance with the progress of the processing. How the virus check program 136 updates the virus check state 606 will be described later.

Figure 7:
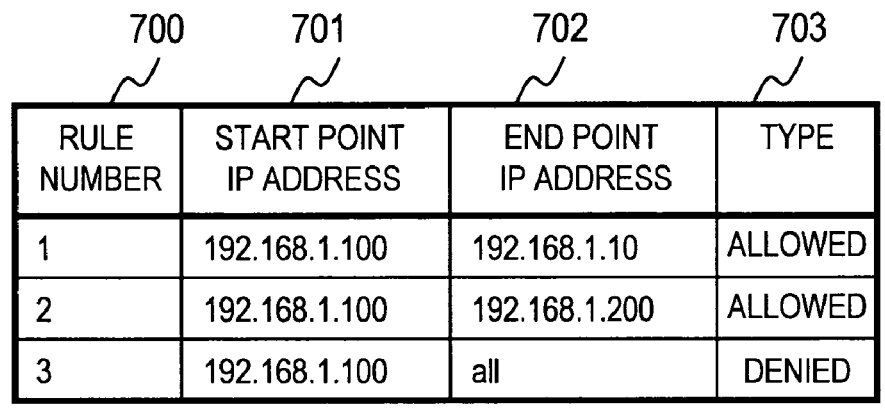
FIG. 7 shows one example of a configuration of a packet filter table.

FIG. 7 shows one example of a configuration of the packet filter table 513.

The packet filter table 513 includes, as shown in FIG. 7, a rule number 700, a start point IP address 701, an end point IP address 702, and a type 703.

The identifier of an entry of the packet filter table 513 is stored as the rule number 700. IP addresses or information "all" are stored as the start point IP address 701 and the end point IP address 702.

Information indicating a file rule type ("allowed" of "denied") is stored as the type 703. A filter rule is information stored in each entry of the packet filter table 513, in other words, information composed of a start point IP address, an end point IP address, and a type. For example, the packet filter table 513 in FIG. 7 holds three types of filter rule. A rule with "1" written in the field for the rule number 700 (a first rule) determines that transfer of an IP packet having 192.168.1.100 as the start point address and 192.168.1.10 as the end point address is allowed.

A third rule determines that, of IP packets received by the switch 501, every packet that has 192.168.1.100 is discarded (not transferred) no matter what end point address it has.

Each time an IP packet is received, the CPU 510 consults the packet filter table 513 to judge whether or not the start point address and end point address of the received IP packet match addresses in any of filter rules written in the packet filter table 513. Then the CPU 510 transfers or discards the received IP packet in accordance with a filter rule that applies to this IP packet.

In the case where plural filter rules in the packet filter table 513 apply to a received IP packet, the CPU 510 preferentially employs a rule that has a smaller rule number. For instance, in FIG. 7, the first rule and the third rule apply to an IP packet whose start point address is 192.168.1.100 and end point address is 192.168.1.10. In this case, the CPU 510 employs the first rule, which has a smaller rule number than the third rule, and transfers the IP packet.

When no filter rule in the packet filter table 513 applies to a received IP packet, the CPU 510 allows the IP packet to be transferred.

Specifics of processing executed by the system that carries out the first embodiment will now be described with reference to FIG. 8.

Figure 8:
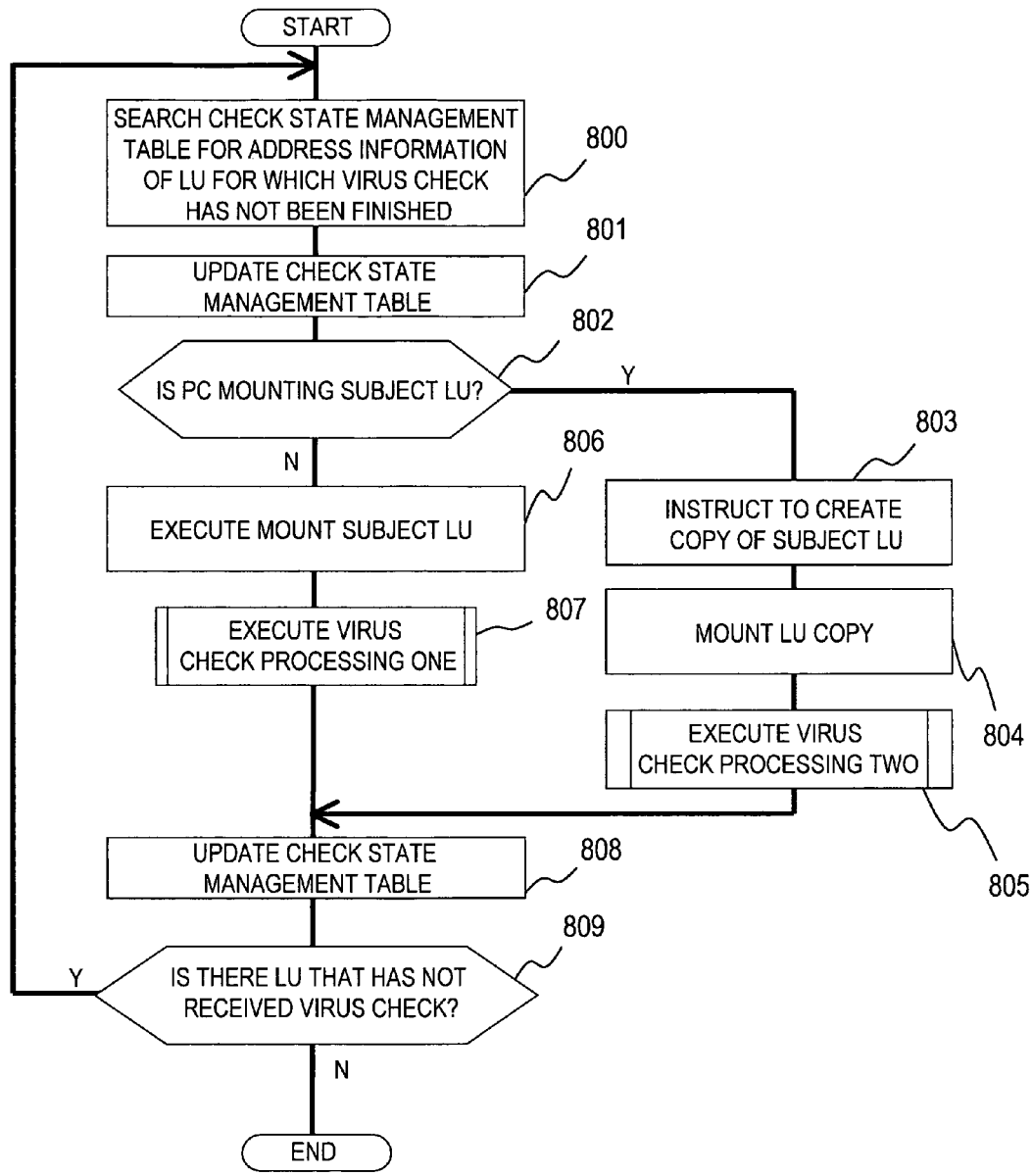
FIG. 8 is a flow chart for processing executed by a system according to the first embodiment.

Processing shown in FIG. 8 is executed as the CPU 130 which executes the virus check program 136 updates the virus definition file 135.

The steps 800, 801, and 802 are processing carried out by the CPU 130 through execution of the virus check program 136.

After updating the virus definition file 135, the CPU 130 first scans the check state management table 134 to choose arbitrarily one of entries in which information "not checked yet" is stored as the virus check state 606. Then the CPU 130 reads out of this entry information stored as the initiator iSCSI name 600, the target IP address 603, the target iSCSI name 604, and the LUN 605 (step 800).

In the following description, the premise is that the entry chosen by the CPU 130 in the step 800 is an entry that holds information of the LU 143.

The CPU 130 changes the virus check state 606 of the entry chosen in the step 800 from "not checked yet" to "checking" (step 801).

Then the CPU 130 activates the initiator 138 to read files in the LU 143 and execute processing of judging whether or not the LU 143 contains an infected file (a virus check). However, when plural PCs simultaneously access files stored in one LU for reading/writing, the consistency of the file system may be broken. In order to avoid this situation, the CPU 130 performs, before executing a virus check on files in the LU 143, processing of judging whether the LU 143 is being mounted by another PC or not.

The CPU 130 sends the target information of the LU 143 which is read in the step 800 to the storage maintenance terminal 141 via the management network 106, thereby inquiring whether or not the LU 143 is mounted at present from the storage maintenance terminal 141. Receiving the inquiry, the CPU 160 of the storage maintenance terminal 141 executes the access state management program 164 to send the target information of the LU 143 to the storage I/F 140 and inquire whether or not the LU 143 is mounted at present from the storage I/F 140. Using the received target information, the CPU 150 of the storage I/F 140 searches the LU access management table 153 for an entry that holds information of the LU 143. The CPU 150 reads out of this entry the access state 402 and sends information ("in use" or "not in use") entered as the access state 402 to the storage maintenance terminal 141. The CPU 160, which executes the access state management program 164, transfers to the virus check server 103 the information sent from the storage I/F 140. Receiving the information, the CPU 130 judges that the LU 143 is currently mounted by another PC when the received information is "in use", and executes a step 803. When the received information is "not in use", the CPU 130 judges that the LU 143 is not mounted by another PC at present, and executes a step 806 (step 802).

Processing for when the information received by the CPU 130 in the step 802 is "in use" (processing of the step 803 and subsequent steps) will be described first.

The CPU 130, which executes the virus check program 136, instructs the storage maintenance terminal 141 to create a copy of the LU 143. The CPU 160 receives the instruction, and executes the copy volume creating program 165 to create a new LU that has the same data as the one stored in the LU 143 (the created LU is hereinafter referred to as "LU copy"). The CPU 160 then arbitrarily determines target information serving as the identifier of the LU copy, which one of the I/Fs 152 in the storage I/F 146 is to be used when the LU copy is mounted, and an initiator iSCSI name to be used by the initiator 138 when the LU copy is mounted. The determined information is sent to the virus check server 103 in order to enable the virus check server 103 to mount the LU copy (step 803).

The CPU 130 executes the initiator 138, and mounts the LU copy using the information received from the storage maintenance terminal 141 (step 804).

The CPU 130 then execute the virus check program 136 to execute virus check processing two (step 805). Specifics of the virus check processing two will be described later.

Processing for when the information received by the CPU 130 in the step 802 is "not in use" (processing of the step 806 and subsequent steps) will be described next.

The CPU 130 executes the initiator 138, and mounts the LU 143 using the information of the LU 143 which is read out of the check state management table 143 in the step 800 (step 806).

The CPU 130 then execute the virus check program 136 to execute virus check processing one (step 807). Specifics of the virus check processing one will be described later.

While the step 806 or the step 807 is executed, the virus check server 103 is mounting the LU 143 and, accordingly, the PC 100 which mounts the LU 143 after net-booted cannot be booted.

To avoid preventing of the net-boot, the CPU 120 of the boot management server 102 executes the TFTP server program as the PC 100 is booted, thereby sending, to the virus check server 103, before sending the NBP 125 to the PC 100, target information of the LU 143, which is to be mounted by the PC 100. Receiving the target information, the CPU 130 searches the check state management table 134 to find out whether or not a virus check is being executed on the LU 143. In the case where the LU 143 is receiving a virus check, the CPU 130 unmounts the LU 143 and sends an unmount completion notification to the boot management server 102. Thereafter, the CPU 130 executes processing of the step 803 and subsequent steps. In this way, the PC 100 which uses the LU 143 can be booted while the virus check server 103 is executing a virus check on the LU 143.

Described next is what processing the CPU 130 executes in a step 808 and a step 809 after the virus check processing one or the virus check processing two is finished. In the steps 808 and 809, the CPU 130 executes the following processing by executing the virus check program 136.

The CPU 130 scans, after the virus check processing one or the virus check processing two is finished, the check state management table 134 to identify which entry holds information of the LU 143, and changes the virus check state 606 of the entry from "checking" to "checked" (step 808).

Then the CPU 130 scans the check state management table 134 to find out whether or not the table has an entry whose virus check state 606 is "not checked yet". When there is an entry whose virus check state 606 is "not checked yet", the CPU 130 repeats processing of the step 800 and subsequent steps as indicated by the arrow in FIG. 8. When the check state management table 134 does not have such entries, the CPU 130 ends the processing (step 809).

When a virus check is finished for all entries through the processing shown in FIG. 8, the CPU 130 rewrites the virus check state 606 in every entry of the check state management table 134 to "not checked yet" in preparation for the next virus check.

Figure 9:
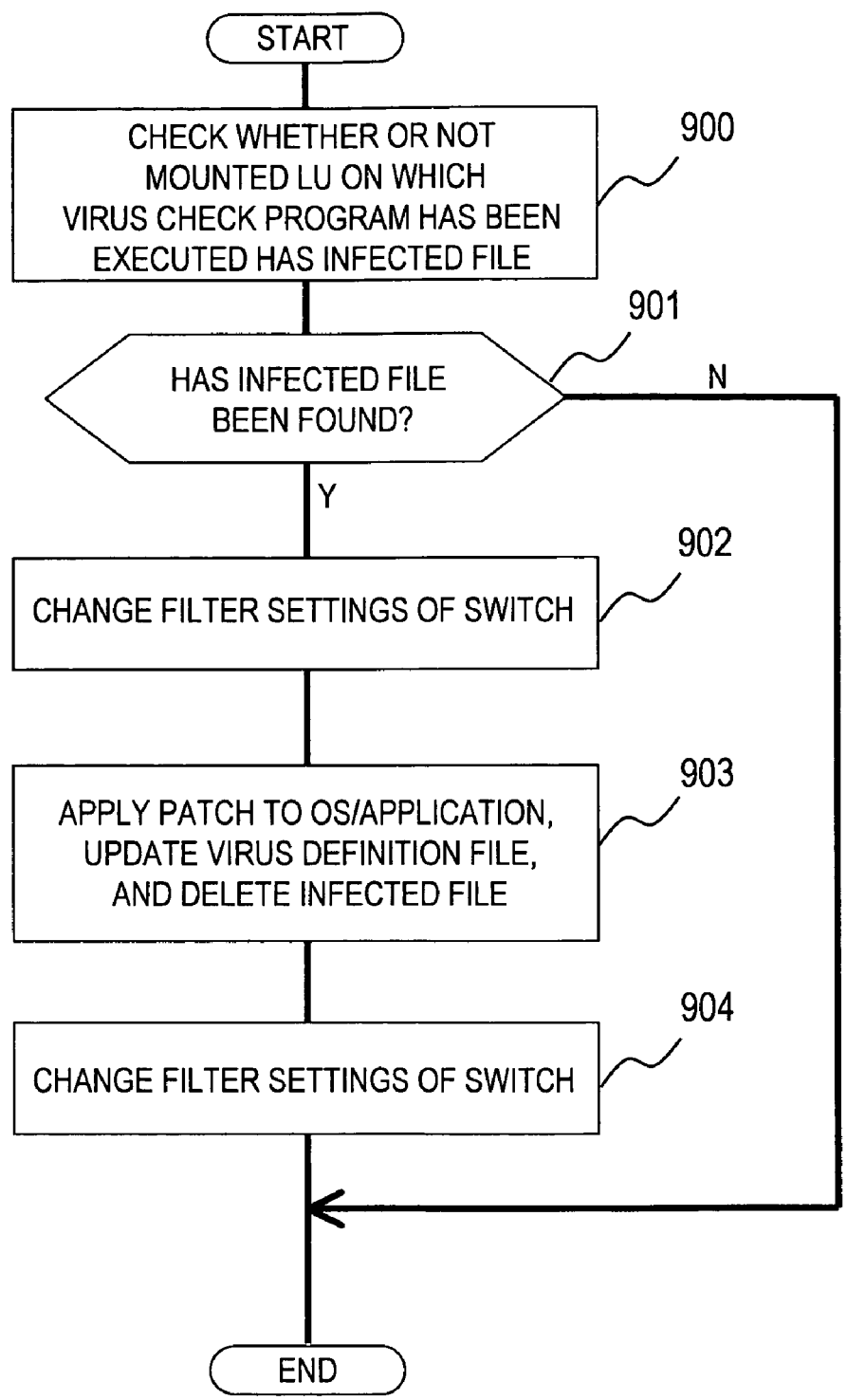
FIG. 9 is a flow chart for virus check processing one.

FIG. 9 is a flow chart showing specifics of the virus check processing one. The virus check processing one is processing carried out by the CPU 130 through execution of the virus check program 136.

The CPU 130 uses the function of the initiator 138 to read files out of the LU 143 mounted in the step 806, and finds out whether or not the LU 143 contains an infected file (step 900).

In the case where a file infected with a virus is found in the step 900, the CPU 130 moves on to a step 902. When no infected file is found, the virus check processing one is ended (step 901).

The step 902 is a step executed when the CPU 130 which executes the virus check program 136 finds a file infected with a virus in the LU 143 or in a copy of the LU 143. In this step, the CPU 130 executes the filter setting program 520 to search, with target information for identifying the LU 143, the check state management table and identify what IP address is assigned to a management port of a switch connected to the PC 100, which uses the LU 143. Then the CPU 130 which executes the filter setting program 520 sends a filter setting command to the identified IP address to set filter settings such that the PC 100 cannot send IP packets to other parts of the system than the virus check server 103 and the storage apparatus 104. Specifically, as in the example shown in FIG. 7, the following three filter rules are registered in the packet filter table 513.

First, the CPU 130 registers a first filter rule which gives permission to transfer of an IP packet that has, as a start point IP address, an IP address (e.g., 192.168.1.100) that is assigned to the I/F 112 of the PC 100 and, as an end point IP address, an IP address (e.g., 192.168.1.10) that is assigned to the I/F 152 of the storage apparatus 104 (see the first rule in FIG. 7).

A second filter rule registered by the CPU 130 gives permission to transfer of an IP packet that has, as a start point IP address, an IP address (e.g., 192.168.1.100) that is assigned to the I/F 112 of the PC 100 and, as an end point IP address, an IP address (e.g., 192.168.1.200) that is assigned to the I/F 132 of the virus check server 103 (see the second rule in FIG. 7).

A third filter rule registered by the CPU 130 discards every IP packet that has, as a start point IP address, an IP address (e.g., 192.168.1.100) that is assigned to the I/F 112 of the PC 100 (see the third rule in FIG. 7).

Assigning smaller rule numbers to the first and second rules than the one given to the third rule enables the CPU 130 to set filter settings such that the PC 100 cannot send IP packets to other parts of the system than the virus check server 103 and the storage apparatus 104 (step 902).

In a step 903, the CPU 130 executes the patch 137 to repair a security hole in the OS 170 or an application in the LU 143. The CPU 130 also compares the date when the virus definition file 135 in the memory 131 is created against the date when the virus definition file 172 in the LU 143 is created. In the case where the virus definition file 172 is older than the virus definition file 135, the CPU 130 deletes the virus definition file 172 and then stores the virus definition file 135 in the LU 143. Furthermore, the CPU 130 cleans a virus out of a file that is found in the step 900 to be infected (step 903).

In a step 904, the CPU 130 executes the filter setting program 520 to set such that the filter rules set in the step 902 to control access of the PC 100 are cancelled (step 904).

Figure 10:
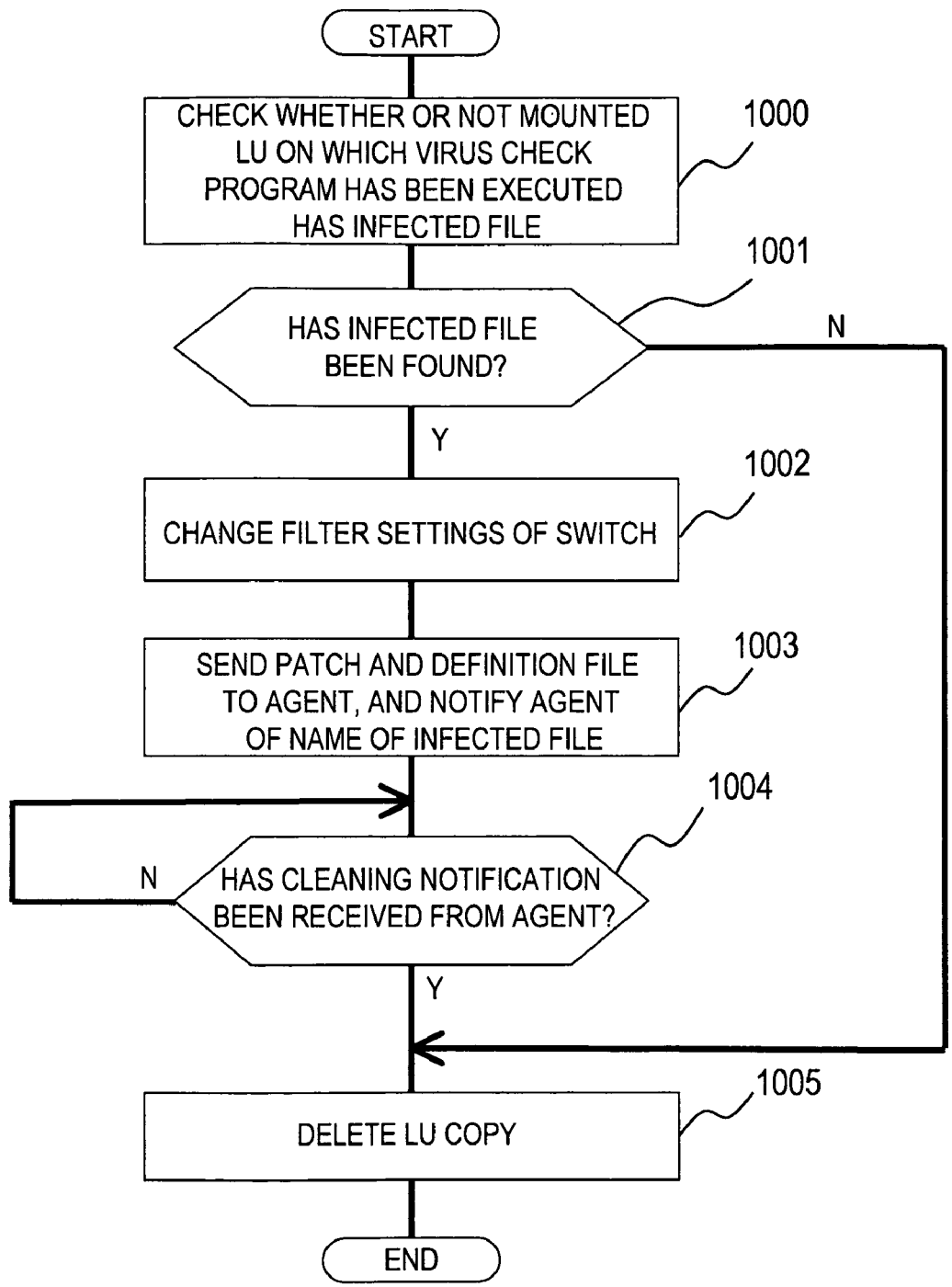
FIG. 10 is a flow chart for virus check processing two.

FIG. 10 is a flow chart showing specifics of the virus check processing two. The virus check processing two is processing carried out by the CPU 130 through execution of the virus check program 136.

The CPU 130 uses the function of the initiator 138 to read files out of the LU copy mounted in the step 806, and finds out whether or not the LU copy contains an infected file (step 1000).

In the case where a file infected with a virus is found in the step 1000, the CPU 130 moves on to a step 1002. When no infected file is found, the CPU 130 moves on to a step 1005 (step 1001).

Here, a description is given on processing of the step 1002 and subsequent steps with the assumption that a file infected with a virus is found in the step 1000.

When the virus check server 103 finds an infected file in an LU, the step 1002 is similar to the step 902 in that filter settings of a switch connected to the PC 100 which has the infected file are changed before a virus is cleaned out of the infected file. A description on processing of the step 1002 is therefore omitted. Such filter settings restrict the PC 100 from accessing other parts of the system than the storage apparatus 104 and the virus check server 103 (step 1002).

Using target information that identifies the LU 143, the CPU 130 searches the check state management table 134 and reads information written as the IP address 601 to find out what IP address is assigned to the PC 100 which uses the LU 143. Next, the CPU 130 sends, to the PC 100 which uses the LU 143, the patch 137, the virus definition file 135, and the file name of the virus-infected file found in the step 1000 (step 1003).

The PC 100 executes the agent 171 to receive the data sent from the CPU 130. Processing executed by the agent 171 after receiving the data will be described later with reference to FIG. 11.

After execution of the step 1003, the CPU 130 waits for a cleaning notification, which is issued by the agent 171 (step 1004).

In the step 1005, the CPU 130 receives the cleaning notification and then executes the initiator 138 to unmount the LU copy. The CPU 130 also instructs the storage maintenance terminal 141 to delete the LU copy. Receiving the deletion instruction, the CPU 160 executes the copy volume creating program 165 to delete the LU copy. After finishing deleting the LU copy, the CPU 160 issues an LU copy deletion notification to the virus check server 103. The virus check server 103 receives the deletion notification, whereby the virus check processing two is ended (step 1005).

Figure 11:
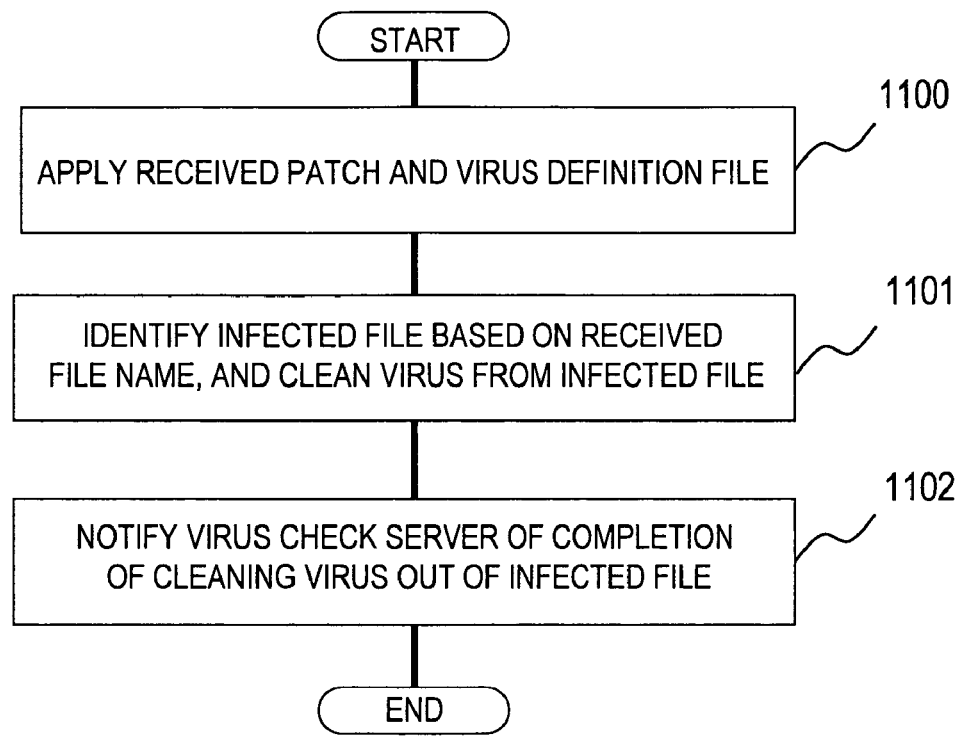
FIG. 11 is a flow chart for processing executed by an agent.

FIG. 11 is a flow chart showing specifics of agent processing. The agent processing is processing executed as the CPU 110, which executes the agent 171, receives information (the patch 137, the virus definition file 172, and the file name of an infected file) sent from the virus check server 103 in the step 1003 of the virus check processing two.

The CPU 110 first executes the received patch 137 to repair a security hole in the OS 170 or an application in the LU 143. The CPU 110 also executes the agent 171 to delete the virus definition file 172, store the virus definition file 135 in the LU 143, and update the old virus definition file (step 1100).

The CPU 110 next activates the virus check program 173 to identify the infected file based on the file name of the virus-infected file which is received from the virus check server 103, and to clean a virus out of the infected file (step 1101).

Finally, the CPU 110 executes the agent 171 to notify the virus check server 103 of completion of virus cleaning, and this completes the agent processing (step 1102).

As has been described with reference to FIGS. 8 to 11, the virus check server 103 executes a virus check on one LU 143 and, when there is a file infected with a virus, the PC 100 cleans the virus. Now, an outline is given of what data is exchanged after the PC 100 in operation is infected with a virus until the virus is cleaned in the first embodiment.

The PC 100 is infected with a virus by obtaining a virus-infected file from the outside, such as a USB memory and e-mail, and executing the file.

The virus check server 103 inquires of the storage maintenance terminal 141 the use state of the LU 143 via the management network 106, and instructs the storage maintenance terminal 141 to create a copy of the LU 143. The virus check server sends virus check data to the created LU copy via the network 105 and the storage I/F 146, which is different from the storage I/F 140 used by the PC 100.

Finding a virus-infected file in the LU copy, the virus check server 103 issues a virus cleaning execution request to the PC 100 via the network 105.

The PC 100 receives, from the virus check server 103, the virus cleaning instruction, the name of the virus-infected file, the patch 137, and the virus definition file 135, and transfers virus cleaning data to the storage I/F 140 via the network 105.

Many viruses are designed to make copies of themselves and sent the copies to other PCs using e-mail, broadcast packets, and the like. A user who has found a PC in a network to be infected with a virus therefore unplugs a cable connecting the PC to the network in order to prevent the virus from spreading. However, in a storage-centric system where a PC accesses a disk via a network, a PC is shut down when a user unplugs a network cable from the PC.

The first embodiment achieves virus cleaning without shutting down a PC by setting filter rules of a switch in the manner described above. With such measures, a virus can be prevented from spreading while maintaining the convenience of a PC.

Second Embodiment

A second embodiment will be described next with reference to FIGS. 12 and 13. The second embodiment describes how this invention is carried out in a system that has one representative virus check server and an arbitrary number of virus check servers.

As in the first embodiment, a virus check server detects a virus definition file update and mounts an LU to check whether or not files stored in the LU are infected with a virus. However, a check state management table, which is used to manage information on whether an LU has received a virus check or not, is stored only in a memory of the representative virus check server, and a virus check program executed by the representative virus check server manages the check state management table.

Other virus check servers inquire, when executing a virus check, on which LU virus check processing is yet to be performed from the representative virus check server. This way, skipping an LU in a virus check or repeatedly executing a virus check on one LU by plural virus check servers is avoided.

Figure 12:
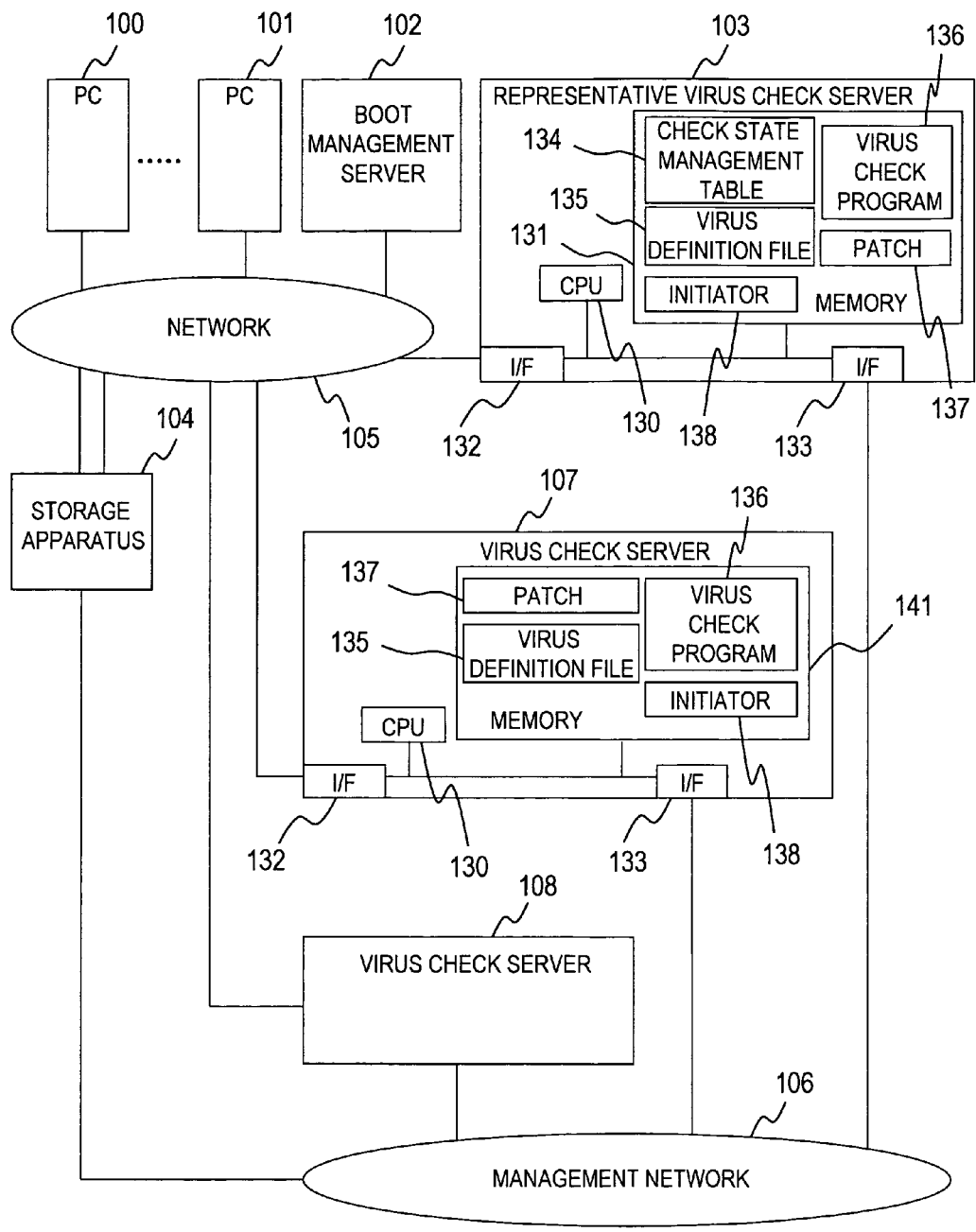
FIG. 12 is a diagram showing one example of a system configuration of a second embodiment.

FIG. 12 is a diagram showing a system configuration in the second embodiment. The description given below with reference to FIG. 12 focuses on differences from the first embodiment.

The PC 100, the PC 101, the boot management server 102, the storage apparatus 104, the network 105, and the management network 106 in FIG. 12 are as described in the first embodiment, and descriptions thereof are omitted. When there are plural virus check servers as in the second embodiment, the storage apparatus 104 may have as many storage I/Fs 46 as the number of virus check servers.

The system in the example shown in FIG. 12 has a representative virus check server 103, a virus check server 107, and a virus check server 108, three virus check serves in total.

The representative virus check server 103 is similar to the virus check server 103 of the first embodiment in that it has, as a hardware configuration, a processor 130 (hereinafter referred to as "CPU 130"), which controls the operation of software, a memory 131, which stores software executed by the CPU 130, and an interface 132 and an interface 133 (hereinafter referred to as "I/F 132" and "I/F 133", respectively), which are connected to external networks.

The memory 131 stores a check state management table 134, a virus definition file 135, a virus check program 136, a patch 137, and an initiator 138, which are the same as the ones in the first embodiment. Descriptions on those stored in the memory 131 are therefore omitted.

Similarly to the representative virus check server 103, the virus check server 107 has, as a hardware configuration, a processor 130 (hereinafter referred to as "CPU 130"), which controls the operation of software, a memory 141, which stores software executed by the CPU 130, and an interface 132 and an interface 133 (hereinafter referred to as "I/F 132" and "I/F 133", respectively), which are connected to external networks.

The memory 141 stores the same data as the memory 131 does except that the memory 141 does not contain the check state management table 134.

The virus check server 108 has the same configuration as that of the virus check server 107, and a description thereof is omitted.

Figure 13:
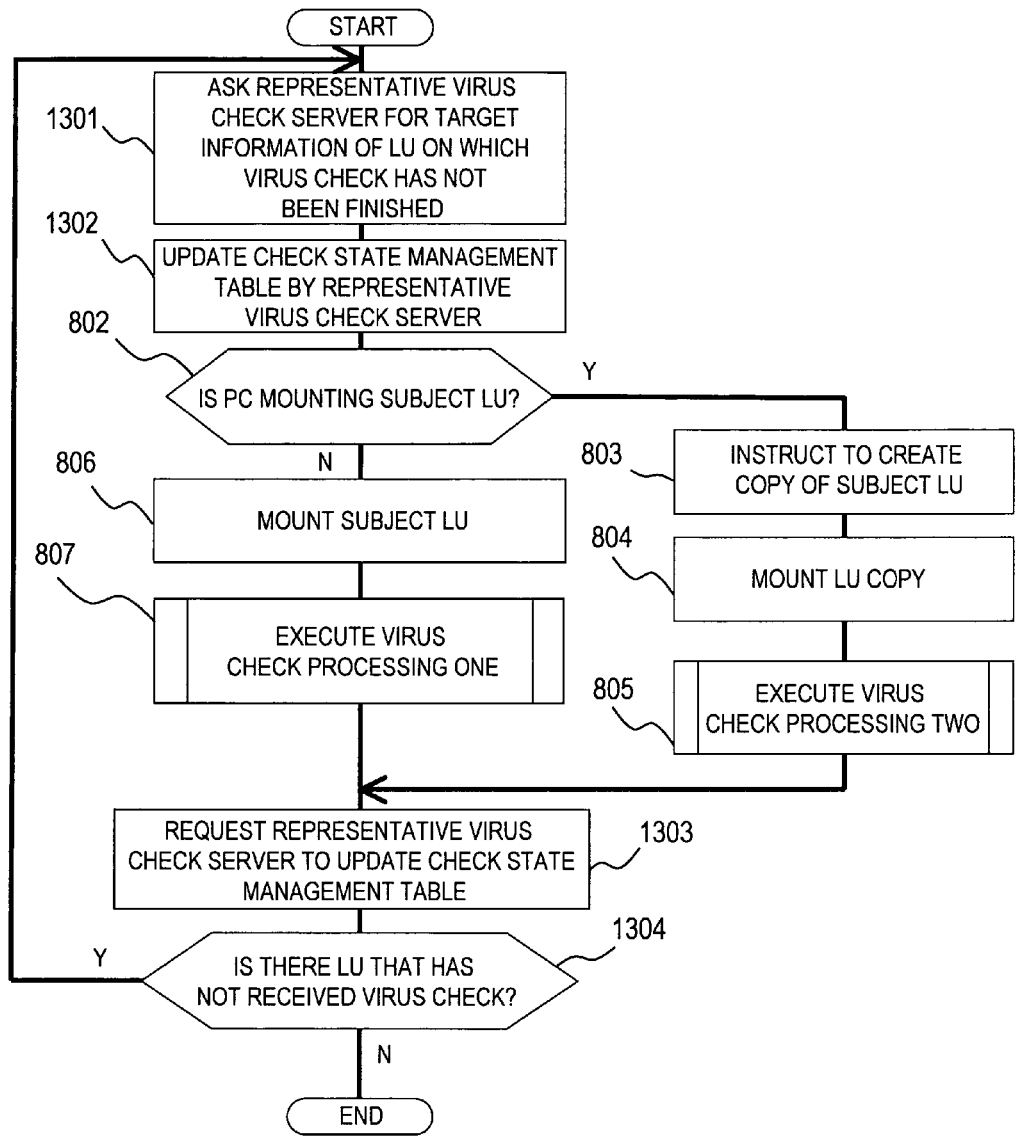
FIG. 13 is a flow chart for processing executed by a system according to the second embodiment.

Described next with reference to FIG. 13 is what processing is executed by the system that carries out the second embodiment. Processing shown in FIG. 13 is executed as the CPU 130 which executes the virus check program 136 updates the virus definition file 135.

Except a step 1301, a step 1302, a step 1303, and a step 1304, the processing shown in FIG. 13 is the same as the processing described in the first embodiment with reference to FIG. 8. Accordingly, the following description deals with processing specifics of the step 1301, the step 1302, the step 1303, and the step 1304, which are differences from the first embodiment.

Processing of the steps 1301 to 1304 is executed by the CPU 130 through execution of the virus check program 136.

The CPU 130 of the virus check server 107 updates the virus definition file 135 and then issues a request to the representative virus check server 103, thereby requesting to inform which LU has not received a virus check. Receiving the request, the CPU 130 of the representative virus check server 103 scans the check state management table 134 to choose arbitrarily one of entries in which information "not checked yet" is stored as the virus check state 606. Then the CPU 130 reads out of this entry information stored as the initiator iSCSI name 600, the target IP address 603, the target iSCSI name 604, and the LUN 605. The CPU 130 sends the read information to the virus check server 107, which has issued the request.

At this point, the CPU 130 of the representative virus check server 103 scans the check state management table 134 to count how many entries have information "checking" as the virus check state 606. In the case where the count is higher than a number set by an administrator of the system in advance, the CPU 130 of the representative virus check server 103 may delay responding to the virus check server 107 until the count becomes lower than the preset number. Adding the above processing enables the representative virus check server 103 to prevent network congestion, which is caused when many virus check servers 107 execute a virus check at once. The representative virus check server 103 may employ, as a material to judge whether to respond to the virus check server 107, instead of the count of entries that hold information "checking", a network transfer data amount which is collected from switches constituting the network 105 by using the SNMP protocol or the like.

When the representative virus check server 103 is the one that has just updated the virus definition file 135, the CPU 130 directly reads the check state management table 134 stored in the memory 131 instead of issuing a request to the representative virus check server 103 (step 1301).

After the step 1301 is finished, the CPU 130 of the representative virus check server 103 which executes the virus check program 136 changes the virus check state 606 of the entry chosen in the step 1301 from "not checked yet" to "checking" (step 1302).

Processing of the step 1302 is executed only by the CPU 130 of the representative virus check server 103.

After the virus check processing one or the virus check processing two is finished, the CPU 130 sends the target information of the LU 143 which is chosen in the step 1301 to the representative virus check server 103, and issues a request to update the check state management table 134. Receiving the request, the CPU 130 of the representative virus check server 103 scans the check state management table 134 to identify which entry holds information of the LU 143. The CPU 130 of the representative virus check server 103 changes the virus check state 606 of this entry from "checking" to "checked". In the case where the representative virus check server 103 is the one that has executed the virus check processing one or the virus check processing two, the CPU 130 directly updates the check state management table 134 stored in the memory 131 instead of issuing a request to the representative virus check server 103 (step 1303).

Then the CPU 130 of the representative virus check server 103 scans the check state management table 134 to find out whether or not the table has an entry whose virus check state 606 is "not checked yet". When there is an entry whose virus check state 606 is "not checked yet", the CPU 130 of the representative virus check server 103 instructs the virus check server 107 that has issued the request to update the check state management table 134 to repeat processing of the step 1301 to the step 1303. When there is no entry whose virus check state 606 is "not checked yet", the CPU 130 of the representative virus check server 103 ends the processing (step 1304).

When a virus check is finished for all entries through the processing shown in FIG. 13, the CPU 130 of the representative virus check server 103 rewrites the virus check state 606 in every entry of the check state management table 134 to "not checked yet" in preparation for the next virus check.

In the case where a virus check has to be executed by a very large number of LUs, the second embodiment makes a quick virus check covering a large-capacity storage area possible by having plural virus check servers execute a virus check on different LUs.

As has been described, according to the first and second embodiments, executing a virus check by a virus check server does not lower the communication speed and disk access speed of user computers. This enables a system administrator to execute a virus check at once without sacrificing users' convenience.

This invention is thus applicable to a virus check in not only a system where the PC 100 is an office PC but also a non-stop system that executes 24 hours a day, 365 days a year, such as an ATM terminal or a POS (Point of Sale) terminal.

Modification Example 1

Virus check processing in the above embodiments is executed as the CPU 130 updates the virus definition file 135, but may be executed periodically in accordance with an execution cycle set by the system administrator in advance. It is also possible for the system administrator to execute a virus check manually at an arbitrary point in time.

Modification Example 2

The above description of the first and second embodiments treats the PC 100 as a net-boot PC, which is booted by reading the OS 170 onto the memory 111 out of the storage apparatus 104 via the network 105. This invention is also applicable to a system in which an information processing machine such as a blade server with plural blades each of which has a CPU and a memory is placed between the PC 100 and the switch 501 to conduct computation of the PC 100 in the blade server (in other words, the PC 100 is a thin client PC).

In the case where a virus check server regularly checks whether there is a virus definition file update or not, the virus check server asks, upon detection of a virus definition file update, an agent executed in one of blades of a blade server whether or not the blade is being used by a thin client PC (in other words, whether or not the PC is accessing the blade). In this system, a storage apparatus, for example, has a table that associates identification information of a blade, identification information of a PC that uses the blade, and identification information of an LU in the storage apparatus that the blade accesses with one another.

When the PC is not accessing the blade, the virus check server sends the latest virus definition file to the blade and at the same time instructs the blade to execute a virus check.

When the PC is accessing the blade (when the blade is being used by the PC), the virus check server issues a request to the storage apparatus, thereby requesting the storage apparatus to create a copy of an LU that is being accessed by the blade. The virus check server then executes a virus check on the LU copy. In the case where a virus infection is found, the virus check server sends the latest virus definition file to a relevant blade server and at the same time instructs the blade server to execute virus cleaning. In virus cleaning, the virus check server sends a filter rule instruction to the switch to put access control. Filter rules set by the instruction are such that, while access between the storage apparatus and the blade server containing the blade that is used by the PC accessing the LU where a virus-infected file is found is granted as well as access between the blade server and the virus check server, other access is denied.

In this modification example, network traffic between a storage apparatus and plural blade servers can be separated from traffic between a virus check server and the storage apparatus and, accordingly, the disk access speed of each blade server is not lowered during a virus check. In addition, since a virus check server executes a virus check in place of a blade server when the blade server is being used by a PC, a virus check can be executed without lowering the efficiency of processing by the blade server's CPU.

Modification Example 3

The above description of the first and second embodiments treats the virus check server 103 and the storage apparatus 104 as separate apparatuses. However, the storage apparatus 104 may have the functions of the virus check server 103 in the case where the storage apparatus 104 is like a NAS head, for example, and has a function of reading a file out of a disk. Then, the storage apparatus 104 has the check state management table 134, the virus definition file 135, the virus check program 136, and the patch 137.

Modification Example 4

In the first and second embodiments described above, basically, one LU 143 is allocated to and used by one PC 100. However, this invention is also applicable to a case in which plural PCs 100 and 101 share one LU 143.

As shown in FIG. 3, upon booting, the PC 100 communicates with the boot management server 102 to obtain from the boot management server 102 an IP address, address information of the LU 143 that the PC 100 accesses, and the like. Thereafter, the boot management server 102 sends to the virus check server 103 information on which PC mounts which LU. The virus check server 103 receives the information and writes the received information in the check state management table 134. Thus creating data of the check state management table 134 dynamically makes it possible to manage which PC is using which LU.

The virus check server 103 employs, for example, the method shown in FIG. 8 to execute a virus check on the LU 143 shared by plural PCs 100. When a virus-infected file is found, the check state management table 134 is consulted to identify the PCs 100 that are using the LU 143, and a virus cleaning execution instruction is sent to the PCs 100.

In virus cleaning, the virus check server 103 sends a filter rule instruction to the switch 501 to put access control. Filter rules set by the instruction are such that, while access between the storage apparatus 104 and the PCs 100 identified as PCs accessing the LU 143 where the virus-infected file is found is granted as well as access between the virus check server 103 and the identified PCs 100, other access is denied.

This invention has an effect of keeping a computer's communication speed and disk access speed from dropping while a virus check program is executed.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
   a storage system including a copying module which creates a copied storage area based on an instruction to create a copy of the storage area;
   a first computer which inputs and outputs data to and from a storage area in the storage system via a first path, wherein the first computer includes: an input/output module which inputs and outputs data to and from the storage area in the storage system via the first path; a memory which stores data inputted and outputted by the input/output module; and a processing module which processes data stored in the memory;

a second computer which instructs the storage system to create a copy of the storage area, and judges, via a second path, whether or not the created copied storage area is infected with a computer virus, wherein the second computer including: an instruction module which instructs the storage system to create the copy of the storage area; and a virus check module which judges, via the second path, whether or not the created copied storage area is infected with a computer virus; and a path changing module, which is placed between the storage system and the first and second computers;

wherein the first computer and the second computer are coupled via a network, and when the second computer judges that a file stored in the copied storage area is infected with a computer virus:

the second computer sends, to the path changing module, an instruction to allow access from the first computer to the storage area in the storage system that is used by the first computer, as well as access between the first computer and the second computer;

the path changing module allows, based on the received instruction, access from the first computer to the storage area in the storage system that is used by the first computer, as well as access between the first computer and the second computer, while prohibiting access between the first computer and other apparatus;

the second computer sends, to the first computer, an instruction to delete a file stored in the storage area that corresponds to the infected file; and the first computer sends, via the first path, an instruction to delete the file stored in the storage area that corresponds to the infected file.

2. The computer system according to claim 1, wherein the first path is different from the second path.

3. The computer system according to claim 1, wherein the first computer reads an operating system stored in the storage area in the storage system via, the first path, stores the read operating system in the memory and is booted by the read operating system.

4. The computer system according to claim 1, wherein the second computer:

stores a virus definition file; and compares a bit string included in a file stored in the copied storage area with a bit string written in the virus definition file and, judges that the file stored in the copied storage area is infected with a computer virus when the bit strings included in the two files include matching characteristics.

5. The computer system according to claim 4, wherein when the virus definition file is updated:

the second computer judges, via the second path, whether or not the created copied storage area is infected with a computer virus;

the second computer sends the updated virus definition file to the first computer; and the first computer receives the virus definition file and stores, via the first path, the received virus definition file in the storage area in the storage system.

6. The computer system according to claim 1, wherein when the second computer judges that a file stored in the copied storage area is infected with a computer virus:

the second computer sends, to the first computer, an identifier of a file stored in the storage area in which the infected file is stored; and the first computer sends, via the first path, based on the identifier, an instruction to delete the file stored in the storage area that corresponds to the infected file.

7. The computer system according to claim 1, wherein the storage system including an access management information being used to identify whether or not the first computer is accessing the storage area; and wherein the second computer:

refers to the access management information of the storage system;

judges, when the first computer is not accessing the storage area, whether or not the storage area is infected with a computer virus via a second path; and sends, when the first computer is accessing the storage area, an instruction to create a copy of the storage area to the storage system and then judges, whether or not the created copied storage area is infected with a computer virus via the second path.

8. A computer having a processor and a memory connected to the processor, comprising:

a communication module which is coupled to another computer via a first path and to a storage system via a second path, where the another computer includes: an input/output module which inputs and outputs data to and from the storage area in the storage system; a memory which stores data inputted and outputted by the input/output module; and a processing module which processes data stored in the memory; and where the storage system including a copying module which creates a copied storage area based on an instruction to create a copy of the storage area;

an instruction module for instructing, via the communication module, when the another computer is to use a storage area in the storage system, and when the storage system is to create a copy of the storage area; and a virus check module for accessing, via the second path and using an identifier received by the communication module from the storage system, the copied storage area to access, and judging whether or not a file stored in the copied storage area is infected with a computer virus; and when the computer judges that a file stored in the copied storage area is infected with a computer virus:

the computer sets access permissions to allow access from the another computer to the storage area in the storage system that is used by the another computer, as well as access between the another computer and the computer;

wherein the access permissions effect access from the another computer to the storage area in the storage system that is used by the another computer, as well as access between the another computer and the computer, while prohibiting access between the another computer and other apparatus;

the computer sends, to the another computer, an instruction to delete a file stored in the storage area that corresponds to the infected file; and the another computer sends, via the first path, an instruction to delete the file stored in the storage area that corresponds to the infected file.

9. The computer according to claim 8, wherein the computer stores a virus definition file, and the virus check module compares a bit string included in a file stored in the copied storage area with a bit string written in the virus definition file and, judges that the file stored in the copied storage area is infected with a computer virus when the bit strings included in the two files include matching characteristics.

10. The computer according to claim 9, wherein, when the virus definition file is updated:
the virus check module judges, via the second path, whether or not the copied storage area is infected with a computer virus;
the virus check module sends the updated virus definition file to the another computer via the first path; and
the another computer stores, via a path different from the second path, the received virus definition file in the storage area in the storage system.

11. The computer according to claim 8, wherein, when the virus check module judges that a file stored in the copied storage area is infected with a computer virus, the virus check module sends, via the first path, to the another computer that uses the storage area corresponding to the copied storage area that stores the infected file, an instruction to delete a file stored in the storage area that corresponds to the infected file in the copied storage area.

12. The computer according to claim 8, wherein the another computer connected to this computer reads an operating system stored in the storage area in the storage system via a path different from the second path, stores the read operating system in the memory and is booted by the read operating system.

* * * * *